United States Patent
Chappalli

(10) Patent No.: US 10,593,252 B1
(45) Date of Patent: Mar. 17, 2020

(54) ELECTRONIC DISPLAY SPATIOTEMPORAL DITHERING SYSTEMS AND METHODS

(71) Applicant: Apple Inc., Cupertino, CA (US)

(72) Inventor: Mahesh B. Chappalli, San Jose, CA (US)

(73) Assignee: Apple Inc., Cupertino, CA (US)

(*) Notice: Subject to any disclaimer, the term of this patent is extended or adjusted under 35 U.S.C. 154(b) by 18 days.

(21) Appl. No.: 15/918,886

(22) Filed: Mar. 12, 2018

(51) Int. Cl.
G09G 3/20 (2006.01)
H04N 9/64 (2006.01)
H04N 5/213 (2006.01)

(52) U.S. Cl.
CPC ......... G09G 3/2051 (2013.01); G09G 3/2055 (2013.01); H04N 5/213 (2013.01); H04N 9/64 (2013.01)

(58) Field of Classification Search
None
See application file for complete search history.

(56) References Cited

U.S. PATENT DOCUMENTS

| 5,404,176 A * | 4/1995 | Lum ................ G09G 5/02 341/131 |
| 6,362,834 B2 * | 3/2002 | Ishii ................ G09G 3/3611 345/596 |
| 7,903,123 B1 | 3/2011 | Alben et al. |
| 9,024,964 B2 | 5/2015 | Ng |
| 2015/0287354 A1 | 10/2015 | Wang et al. |

* cited by examiner

Primary Examiner — Edward Martello
(74) Attorney, Agent, or Firm — Fletcher Yoder, P.C.

(57) ABSTRACT

An electronic device may include an electronic display to display an image, based in part on display image data that indicates target luminance of the image using a first bit-depth, and a display pipeline. The display pipeline may include dither processing circuitry to determine a pixel cluster of multiple pixel groups of input image data that indicates target luminance using a second bit-depth greater than the first bit-depth. The dither processing circuitry may also determine a phase combination which associates a different dither phase to each of the pixel groups. The dither processing circuitry may also determine and apply a dither pattern and a dither phase to each pixel group to generate dithered image data corresponding with the display image data with the first bit-depth. The dither pattern may be based in part on the least significant bits of input image data of the pixel groups.

20 Claims, 12 Drawing Sheets

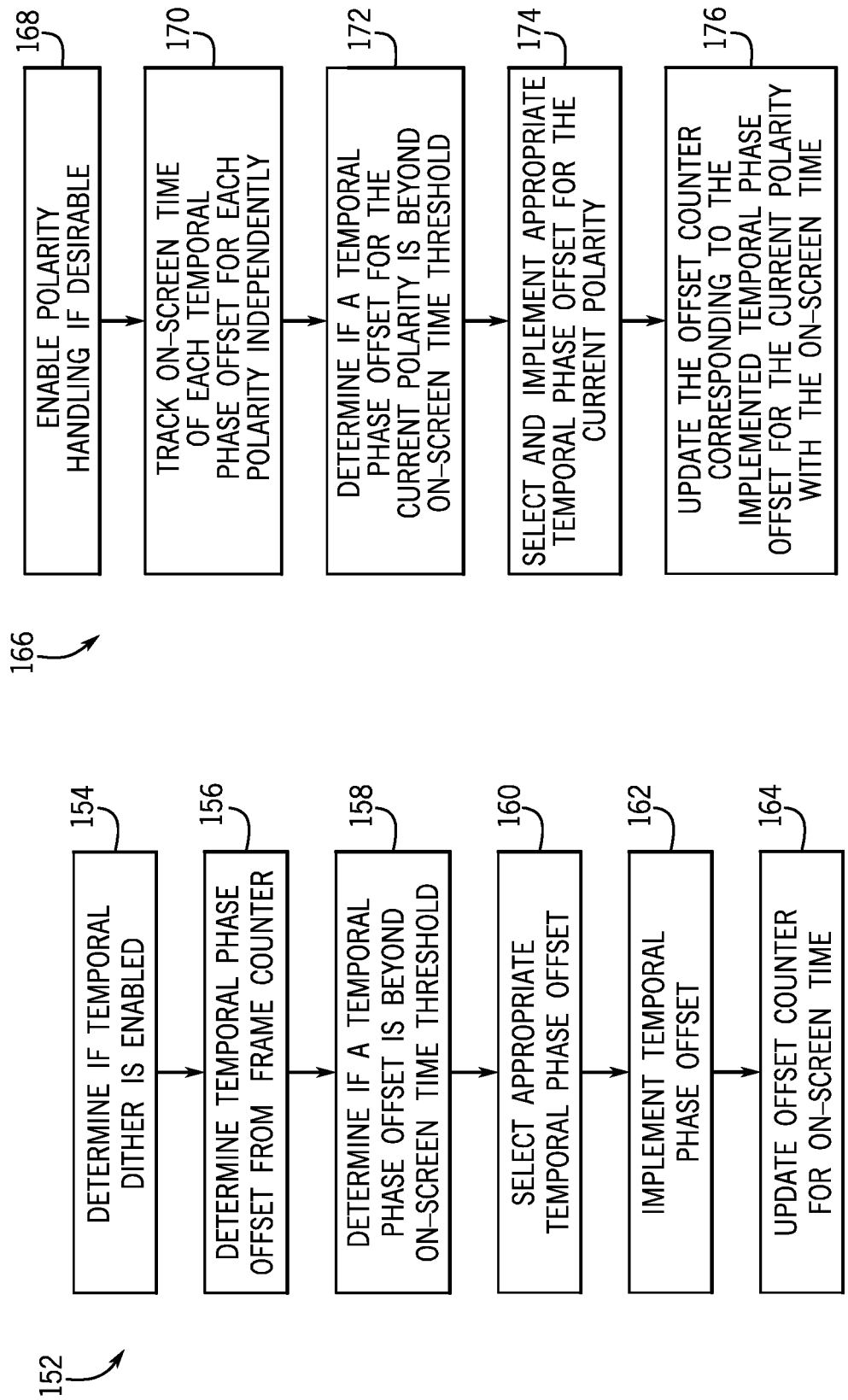

ELECTRONIC DISPLAY SPATIOTEMPORAL DITHERING SYSTEMS AND METHODS

BACKGROUND

The present disclosure relates generally to electronic displays and, more particularly, to spatiotemporal dithering of image data used to display images on an electronic display.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices often use one or more electronic displays to present visual representations of information as text, still images, and/or video by displaying one or more images (e.g., image frames). For example, such electronic devices may include computers, mobile phones, portable media devices, tablets, televisions, virtual-reality headsets, and vehicle dashboards, among many others. To display an image, an electronic display may control light emission (e.g., luminance) of its display pixels based at least in part on corresponding image data.

Generally, image data corresponding with an image may indicate target luminance (e.g., per color component or grayscale) of a display pixel for displaying the image. However, in some instances, image data may indicate target luminance using a higher bit-depth than an electronic display is capable of displaying. Thus, before being used to display an image, the image data may be processed to convert the image data to a bit-depth compatible with the electronic display. However, at least in some instances, techniques used to convert bit-depth of image data may affect resulting perceived image quality of a corresponding image, for example, due to a reduction of displayable color pallet per image frame.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

To display an image, an electronic display generally controls light emission (e.g., luminance and/or color) of its display pixels based on corresponding image data. For example, an image data source may output image data as a stream of image pixels (e.g., pixel data), which each indicates target luminance of a display pixel located at a corresponding pixel position. In some embodiments, image data may indicate target luminance per color component, for example, via red component image data, blue component image data, and green component image data. Additionally or alternatively, image data may indicate target luminance in grayscale (e.g., gray level).

In some instances, it may be desirable to reduce the bit-depth of the image data of such components. For example, image data may indicate target luminance using a higher bit-depth than an electronic display is capable of displaying. Thus, before being used to display an image, the image data may be processed to convert the image data to a lower bit-depth.

Accordingly, to facilitate improving perceived image quality, the present disclosure provides techniques for adjusting bit-depth of image data by dithering the image data, for example, spatially and/or temporally via a display pipeline. In some embodiments, a display pipeline may dither image data to facilitate smoothing shading and/or increasing the number of perceivable colors on an electronic display. For example, the display pipeline may dither image data by varying color and/or gray level of display pixels by location (e.g., pixel position) and/or time (e.g., image frame).

In some embodiments, temporal dithering may include a phase associated with dithering the image data in time and/or location. Additionally, a phase offset may be incorporated to further increase the temporal aspect of the dither process. The phase offset may also be tracked over time to give approximately equal on-screen times to each phase offset.

BRIEF DESCRIPTION OF THE DRAWINGS

Various aspects of this disclosure may be better understood upon reading the following detailed description and upon reference to the drawings in which:

FIG. 15 is a flowchart of a process for setting a temporal phase offset used in the advanced dithering stage of FIG. 10, in accordance with an embodiment; and FIG. 16 is a flowchart of a process for setting a temporal phase offset, in a polarity switching embodiment, used in the advanced dithering stage of FIG. 10, in accordance with an embodiment.

DETAILED DESCRIPTION OF SPECIFIC EMBODIMENTS

Figure 1:
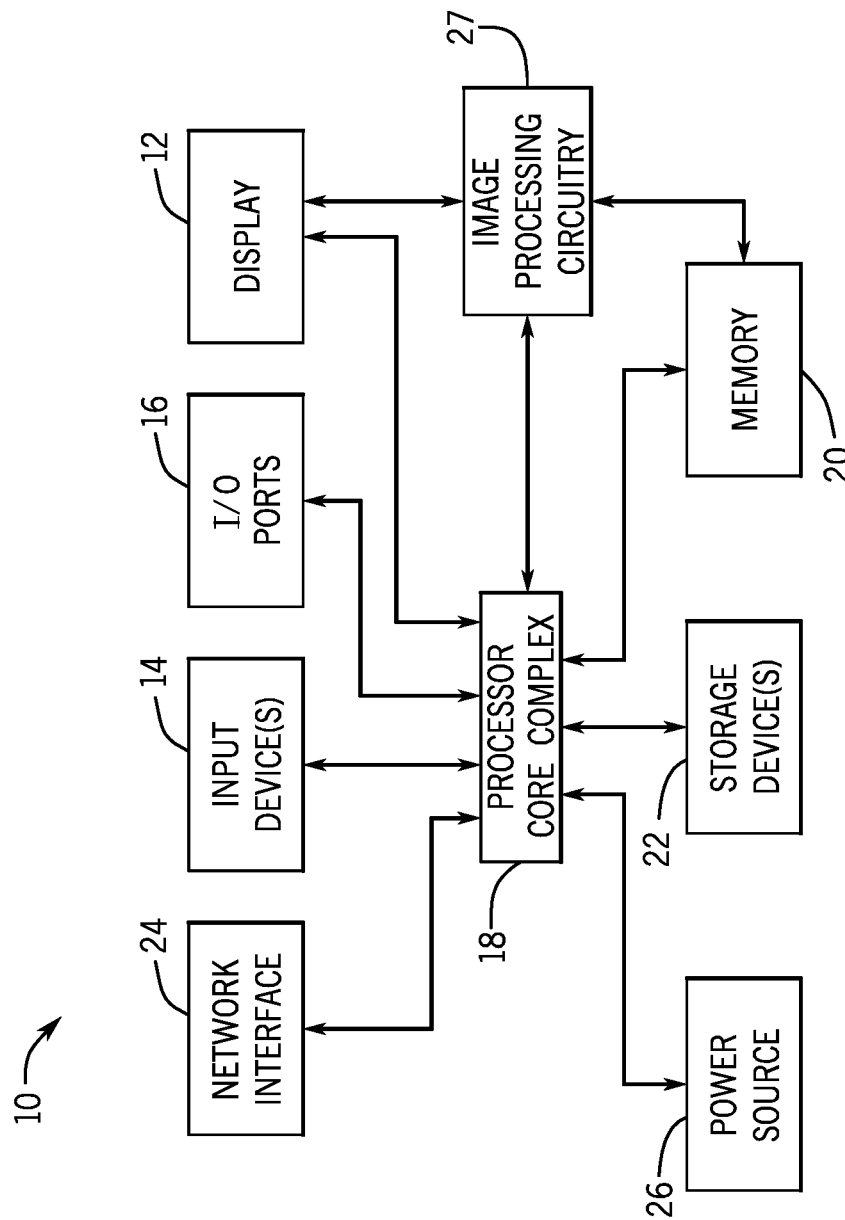
FIG. 1 is a block diagram of an electronic device that includes an electronic display, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

To facilitate communicating information, electronic devices often use one or more electronic displays to present visual representations of the information via one or more images (e.g., image frames). Such electronic devices may include computers, mobile phones, portable media devices, tablets, televisions, virtual-reality headsets, and vehicle dashboards, among many others. Additionally or alternatively, an electronic display may take the form of a liquid crystal display (LCD), a light emitting diode (LED) display, an organic light emitting diode (OLED) display, a plasma display, or the like.

In any case, to display an image, an electronic display generally controls light emission (e.g., luminance and/or color) of its display pixels based on corresponding image data. For example, an image data source (e.g., memory, an input/output (I/O) port, and/or a communication network) may output image data as a stream of image pixels (e.g., pixel data), which each indicates target luminance of a display pixel located at a corresponding pixel position. In some embodiments, image data may indicate target luminance per color component, for example, via red component image data, blue component image data, and green component image data. Additionally or alternatively, image data may indicate target luminance in grayscale (e.g., gray level).

To facilitate improving perceived image quality, image data may be processed before being used to display a corresponding image, for example, via a display pipeline implemented via hardware (e.g., circuitry) and/or software (e.g., execution of instructions stored in tangible, non-transitory, media). For example, in some instances, source image data may have a higher bit-depth than an electronic display is capable of displaying. A simple rounding and/or truncation of the source image data may produce display image data with bit-depth displayable by the electronic display. However, at least in some instances, this may affect perceived image quality when used to display an image, for example, by resulting in perceivable visual artifacts, such as banding, flatness, and/or loss of detail.

Accordingly, to facilitate improving perceived image quality, the present disclosure provides techniques for adjusting bit-depth of image data by dithering the image data, for example, spatially and/or temporally. In some embodiments, a display pipeline may dither image data to facilitate smoothing shading and/or increasing the number of perceivable colors on an electronic display. For example, the display pipeline may dither image data by varying color and/or gray level of display pixels by location (e.g., pixel position) and/or time (e.g., image frame).

To help illustrate, an electronic device 10, which includes an electronic display 12, is shown in FIG. 1. As will be described in more detail below, the electronic device 10 may be any suitable electronic device 10, such as a computer, a mobile phone, a portable media device, a tablet, a television, a virtual-reality headset, a vehicle dashboard, and the like. Thus, it should be noted that FIG. 1 is merely one example of a particular implementation and is intended to illustrate the types of components that may be present in an electronic device 10.

In the depicted embodiment, the electronic device 10 includes the electronic display 12, one or more input devices 14, one or more input/output (I/O) ports 16, a processor core complex 18 having one or more processor(s) or processor cores, local memory 20, a main memory storage device 22, a network interface 24, a power source 26, and image processing circuitry 27. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 20 and the main memory storage device 22 may be included in a single component. Additionally or alternatively, the image processing circuitry 27 (e.g., a graphics processing unit) may be included in the processor core complex 18.

As depicted, the processor core complex 18 is operably coupled with local memory 20 and the main memory storage device 22. Thus, the processor core complex 18 may execute instruction stored in local memory 20 and/or the main memory storage device 22 to perform operations, such as generating and/or transmitting image data. As such, the processor core complex 18 may include one or more general purpose microprocessors, one or more application specific integrated circuits (ASICs), one or more field programmable logic arrays (FPGAs), or any combination thereof.

In addition to instructions, the local memory 20 and/or the main memory storage device 22 may store data to be processed by the processor core complex 18. Thus, in some embodiments, the local memory 20 and/or the main memory storage device 22 may include one or more tangible, non-transitory, computer-readable mediums. For example, the local memory 20 may include random access memory (RAM) and the main memory storage device 22 may include read only memory (ROM), rewritable non-volatile memory such as flash memory, hard drives, optical discs, and/or the like.

As depicted, the processor core complex 18 is also operably coupled with the network interface 24. In some embodiments, the network interface 24 may facilitate data communication with another electronic device and/or a communication network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, and/or a wide area network (WAN), such as a 4G or LTE cellular network.

Additionally, as depicted, the processor core complex 18 is operably coupled to the power source 26. In some embodiments, the power source 26 may provide electrical power to one or more components in the electronic device 10, such as the processor core complex 18 and/or the electronic display 12. Thus, the power source 26 may include any suitable source of energy, such as a rechargeable lithium polymer (Li-poly) battery and/or an alternating current (AC) power converter.

Furthermore, as depicted, the processor core complex 18 is operably coupled with the one or more I/O ports 16. In some embodiments, I/O ports 16 may enable the electronic device 10 to interface with other electronic devices. For example, when a portable storage device is connected, the I/O port 16 may enable the processor core complex 18 to communicate data with the portable storage device.

As depicted, the electronic device 10 is also operably coupled with the one or more input devices 14. In some embodiments, an input device 14 may facilitate user interaction with the electronic device 10, for example, by receiving user inputs. Thus, an input device 14 may include a button, a keyboard, a mouse, a trackpad, and/or the like. Additionally, in some embodiments, an input device 14 may include touch-sensing components in the electronic display 12. In such embodiments, the touch sensing components may receive user inputs by detecting occurrence and/or position of an object touching the surface of the electronic display 12.

In addition to enabling user inputs, the electronic display 12 may include a display panel with one or more display pixels. The electronic display 12 may control light emission from its display pixels to present visual representations of information, such as a graphical user interface (GUI) of an operating system, an application interface, a still image, or video content, by displaying frames based at least in part on corresponding image data (e.g., image pixel data located at individual pixel positions).

As depicted, the electronic display 12 is operably coupled to the processor core complex 18 and the image processing circuitry 27. In this manner, the electronic display 12 may display images based at least in part on image data received from an image data source, such as the processor core complex 18 and/or the image processing circuitry 27. In some embodiments, the image data source may generate source image data to create a digital representation of the image to be displayed. In other words, the image data is generated such that the image view on the electronic display 12 accurately represents the intended image. To facilitate accurately representing an image, image data may be processed before being supplied to the electronic display 12, for example, via a display pipeline implemented in the processor core complex 18 and/or the image processing circuitry 27.

As will be described in more detail below, the display pipeline may perform various processing operations, such as spatial dithering, temporal dithering, pixel color-space conversion, luminance determination, luminance optimization, image scaling, and/or the like. For example, the display pipeline may spatial dither image data to add color noise to facilitate reducing likelihood of producing perceivable visual artifacts (e.g., banding and/or flat areas) when the electronic display 12 displays a corresponding image. Additionally or alternatively, the electronic display 12 may display images based at least in part on image data received via the network interface 24, an input device 14, and/or an I/O port 16.

In some embodiments, after image data is received, the electronic display 12 may perform additional processing on the image data, for example, facilitate further improving the accuracy of a viewed image. For example, the electronic display 12 may again spatially dither the image data. Additionally or alternatively, the electronic display 12 may temporally dither the image data to modify pixels in successively displayed images to enable perception of an intermediate color via color blending across the images. For example, a display pixel in one image may be blue and red in the next image. Thus, when the two images are rapidly displayed successively, a viewer's eye may perceive a purple pixel.

Figure 2:
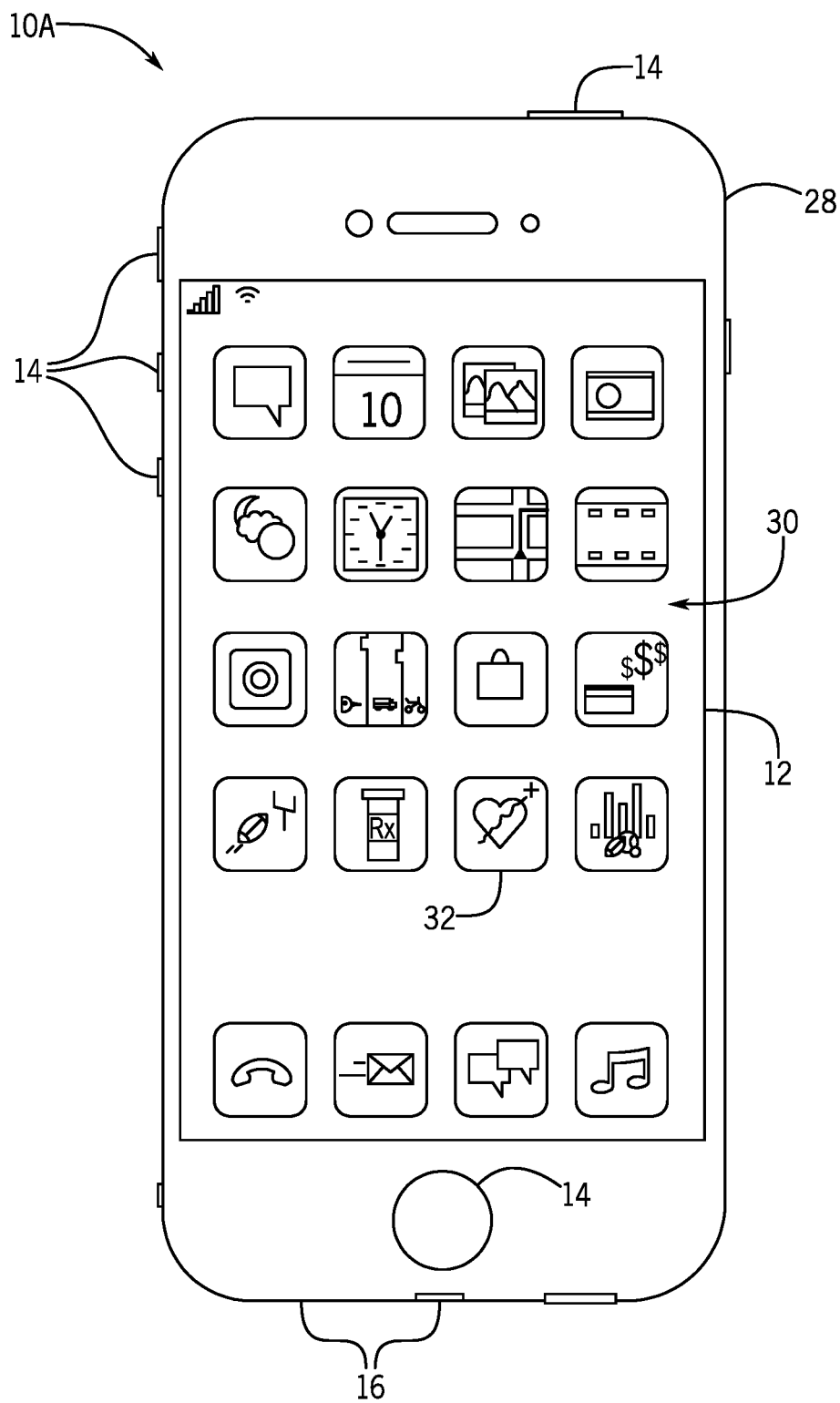
FIG. 2 is an example of the electronic device of FIG. 1, in accordance with an embodiment.

As described above, the electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For illustrative purposes, the handheld device 10A may be a smart phone, such as any iPhone® model available from Apple Inc.

As depicted, the handheld device 10A includes an enclosure 28 (e.g., housing). In some embodiments, the enclosure 28 may protect interior components from physical damage and/or shield them from electromagnetic interference. Additionally, as depicted, the enclosure may 28 surround the electronic display 12. In the depicted embodiment, the electronic display 12 is displaying a graphical user interface (GUI) 30 having an array of icons 32. By way of example, when an icon 32 is selected either by an input device 14 or a touch-sensing component of the electronic display 12, an application program may launch.

Furthermore, as depicted, input devices 14 may be accessed through openings in the enclosure 28. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. As depicted, the I/O ports 16 may be accessed through openings in the enclosure 28. In some embodiments, the I/O ports 16 may include, for example, an audio jack to connect to external devices.

Figure 3:
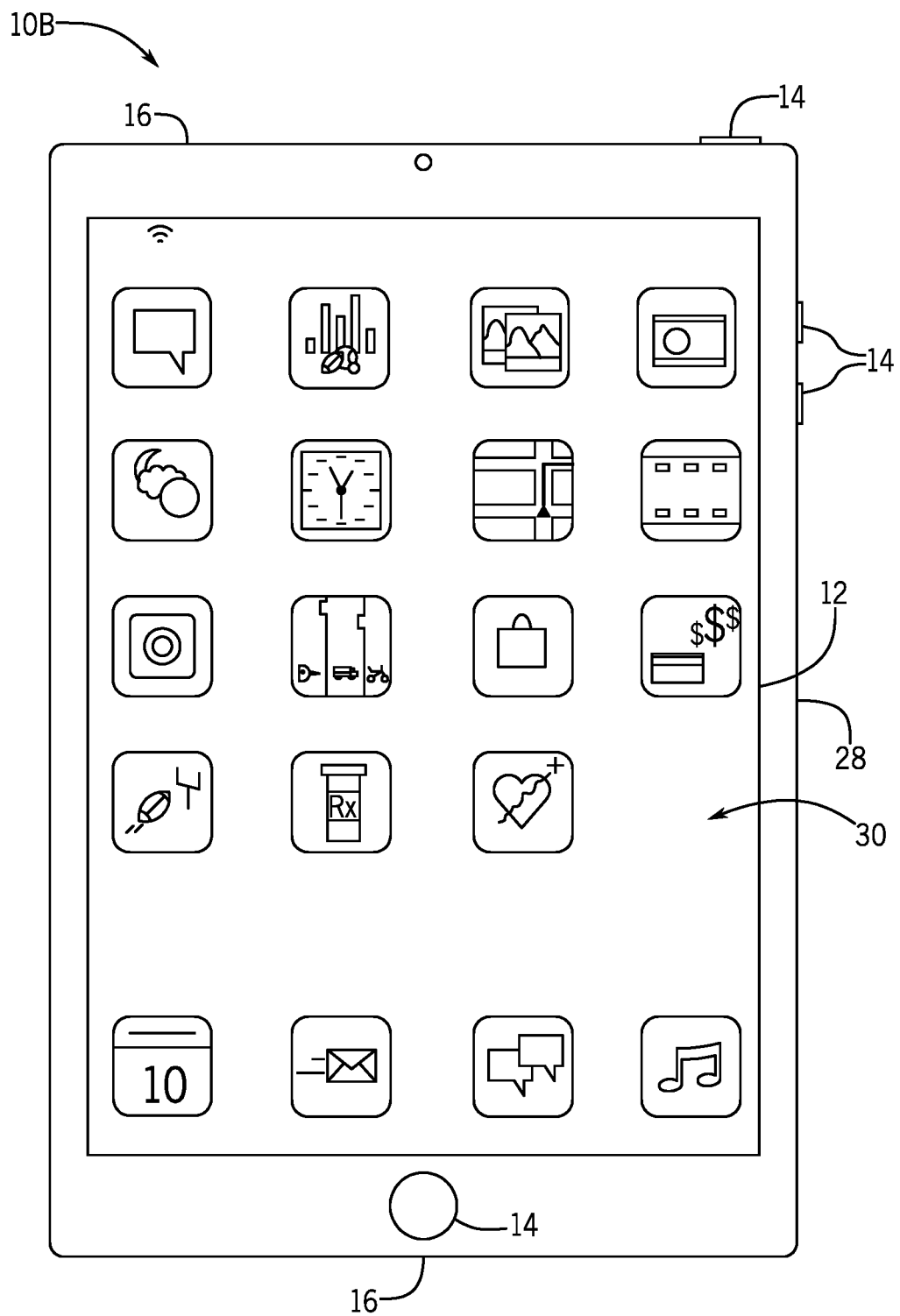
FIG. 3 is another example of the electronic device of FIG. 1, in accordance with an embodiment.
Figure 4:
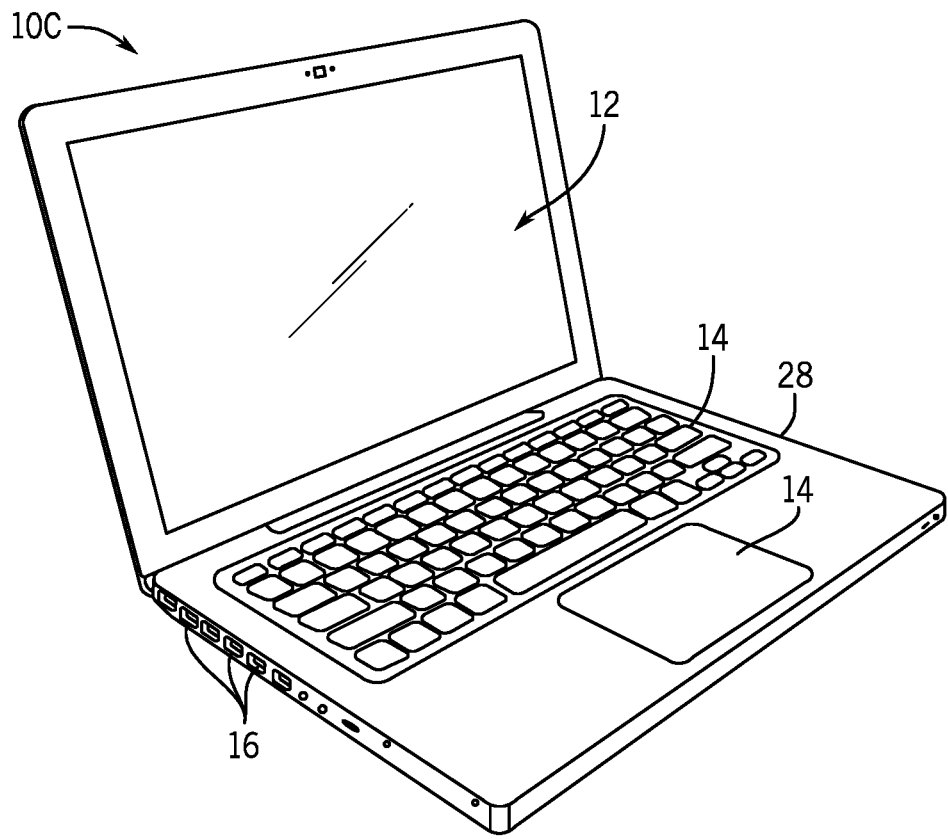
FIG. 4 is another example of the electronic device of FIG. 1, in accordance with an embodiment.
Figure 5:
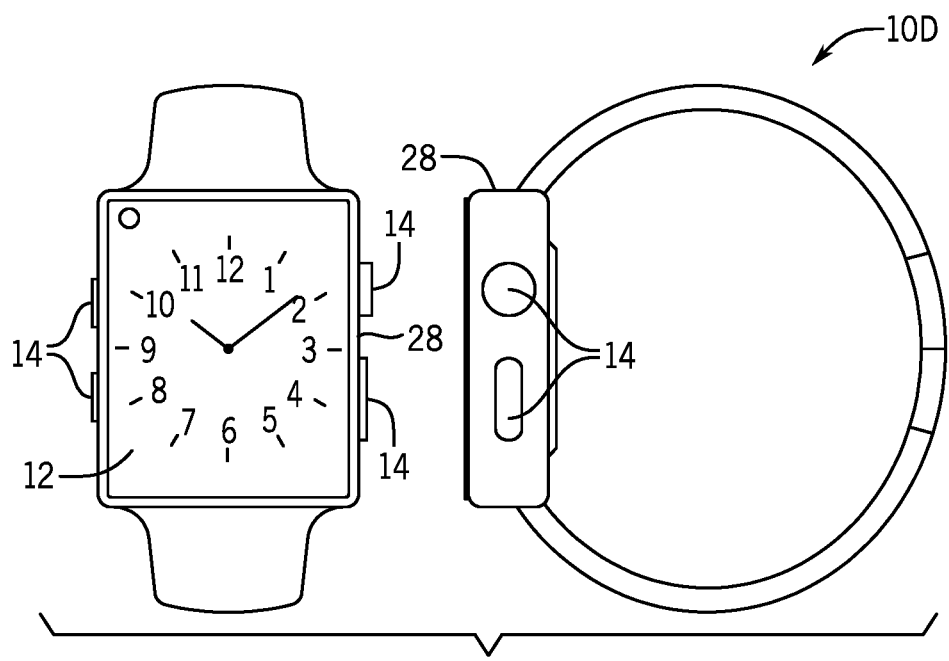
FIG. 5 is another example of the electronic device of FIG. 1, in accordance with an embodiment.

To further illustrate, another example of a suitable electronic device 10, specifically a tablet device 10B, is shown in FIG. 3. For illustrative purposes, the tablet device 10B may be any iPad® model available from Apple Inc. A further example of a suitable electronic device 10, specifically a computer 10C, is shown in FIG. 4. For illustrative purposes, the computer 10C may be any Macbook® or iMac® model available from Apple Inc. Another example of a suitable electronic device 10, specifically a watch 10D, is shown in FIG. 5. For illustrative purposes, the watch 10D may be any Apple Watch® model available from Apple Inc. As depicted, the tablet device 10B, the computer 10C, and the watch 10D each also includes an electronic display 12, input devices 14, I/O ports 16, and an enclosure 28.

Figure 6:
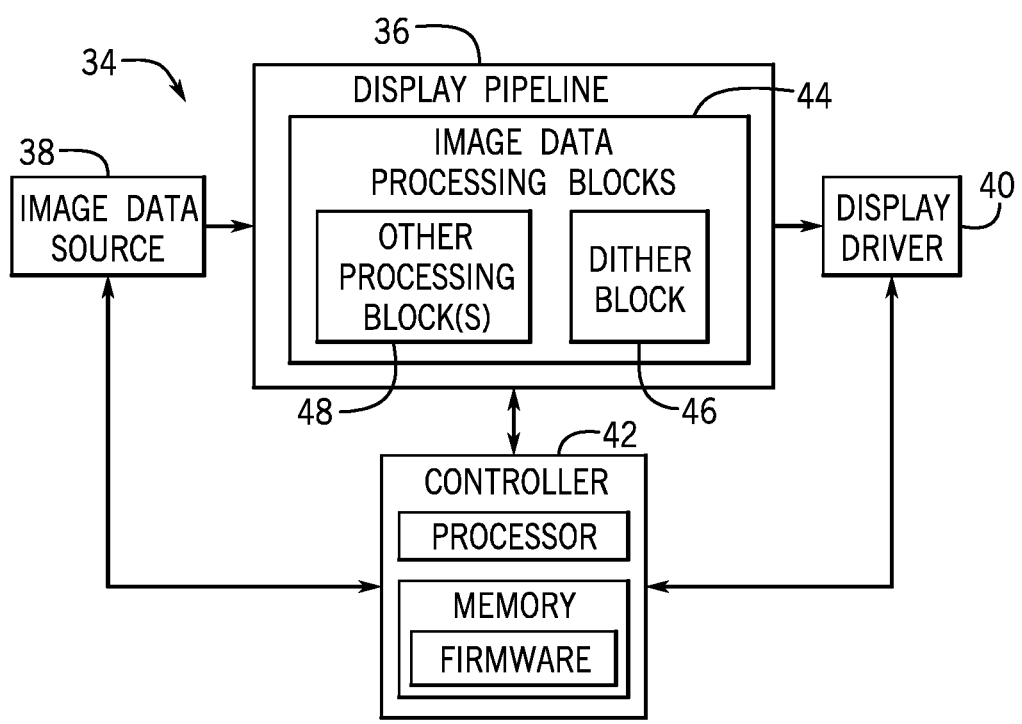
FIG. 6 is a block diagram of a display pipeline coupled between an image data source and a display driver of the electronic device of FIG. 1, in accordance with an embodiment.

As described above, an electronic display 12 may display images based on image data received from an image data source. To help illustrate, a portion 34 of the electronic device 10 including a display pipeline 36 that operationally retrieves, processes, and outputs image data is shown in FIG. 6. In some embodiments, a display pipeline 36 may analyze and/or process image data received from an image data source 38, for example, by spatially and/or temporally dithering the image data before the image data is used to display an image. To display an image, in some embodiments, a display driver 40 may generate and supply analog and/or digital electrical signals to display pixels of the electronic display 12 based at least in part on image data, for example, received from the display pipeline 36.

In some embodiments, the display pipeline 36 may be implemented in the electronic device 10, the electronic display 12, or a combination thereof. For example, the display pipeline 36 may be included in the processor core complex 18, the image processing circuitry 27, a timing controller (TCON) in the electronic display 12, one or more other processing units or circuitry, or any combination thereof.

In some embodiments, a controller 42 may control operation of the display pipeline 36, the image data source 38, and/or the display driver 40. To facilitate controlling operation, the controller 42 may include a controller processor and controller memory. In some embodiments, the controller processor may execute instructions stored in the controller memory (e.g., firmware). Thus, in some embodiments, the controller processor may be included in the processor core complex 18, the image processing circuitry 27, a timing controller in the electronic display 12, a separate processing module, or any combination thereof. Additionally, in some embodiments, the controller memory may be included in the local memory 20, the main memory storage device 22, a separate tangible, non-transitory, computer readable medium, or any combination thereof.

In some embodiments, the image data source 38 may include a source buffer that stores source image data. Thus, in such embodiments, the display pipeline 36 may fetch (e.g., retrieve) source image data from the source buffer for processing. In some embodiments, the electronic device 10 may include multiple processing pipelines (e.g., display pipeline 36) implemented to process image data. To facilitate communication, image data may be stored in the image data source 38, external from the processing pipelines. In such embodiments, a processing pipeline, such as the display pipeline 36, may include a direct memory access (DMA) block that reads (e.g., retrieves) and/or writes (e.g., stores) image data in the image data source 38.

After received from the image data source 38, the display pipeline 36 may process source image data via one or more image processing blocks 44. In the depicted embodiment, the image processing blocks 44 include a dither block 46. As will be described in more detail below, the dither block 46 may adjust image data (e.g., by color component and/or grey level), for example, to facilitate compensating for quantization error due to a reduction in bit color depth. As an illustrative example, an electronic display 12 may not be able to produce the full color pallet of source image data. Instead of merely rounding or estimating to the nearest color, the dither block 46 may introduce color noise to intertwine colors of the electronic display's color pallet at localized display pixels to approximate the original image data, thereby providing a more aesthetic, clear, and/or sharp image for viewing. Additionally or alternatively, the dither block 46 may also provide temporal and/or spatiotemporal dithering which may change and/or alternate color levels in successive images to enable perception of a target intermediate color.

In some embodiments, the display pipeline 36 may also include one or more other processing blocks 48. For example, the other processing block 48 may include a color management block, a pixel contrast control block, and/or a crop block. After processing, the display pipeline 36 may output display image data to the display driver 40. Based at least in part on target luminance (e.g., gray level) indicated by the display image data, the display driver 40 may control luminance of display pixels to display a corresponding image on the electronic display 12. For example, when it has an 8-bit bit-depth (e.g., format), the display image data may indicate target luminance of a corresponding display pixel as a value from 0 (e.g., darkest) to 255 (e.g., brightest).

In some embodiments, image data bit-depth may vary based on various factors, such as file type (e.g., GIF, PNG, or JPEG, etc.) and/or source (e.g., original) image color precision. Since a display pixel generally include multiple sub-pixels that control luminance of different colors, display image data generally includes a color component corresponding with each of the different colors. For example, when a display pixel includes a red sub-pixel, a blue sub-pixel and a green sub-pixel, display image data corresponding with the display pixel may include red component image data, which indicates target luminance of the red sub-pixel, blue component image data, which indicates target luminance of the blue sub-pixel, and green component image data, which indicates target luminance of the green sub-pixel. Additionally or alternatively, image data may indicate target luminance via grayscale, for example, based on target luminance of the various color components.

The number of possible luminance values may be governed by the bit-depth of the image data. For example, 36-bit RGB image data may allocate 12-bits per color component, thereby enabling target luminance (e.g., intensity) of each color component to be indicated as any one of 4096 different intensity levels. However, it may be desired to reduce the bit-depth of image data, for example, when an electronic display 12 is designed to display image data with a lower bit-depth, to facilitate reducing storage space used to store the image data, and/or to facilitate reducing communication bandwidth used to communicate the image data. To facilitate reducing bit-depth while maintaining visual accuracy of a resulting image, as described above, the display pipeline 36 may perform one or more dithering operations.

Figure 7:
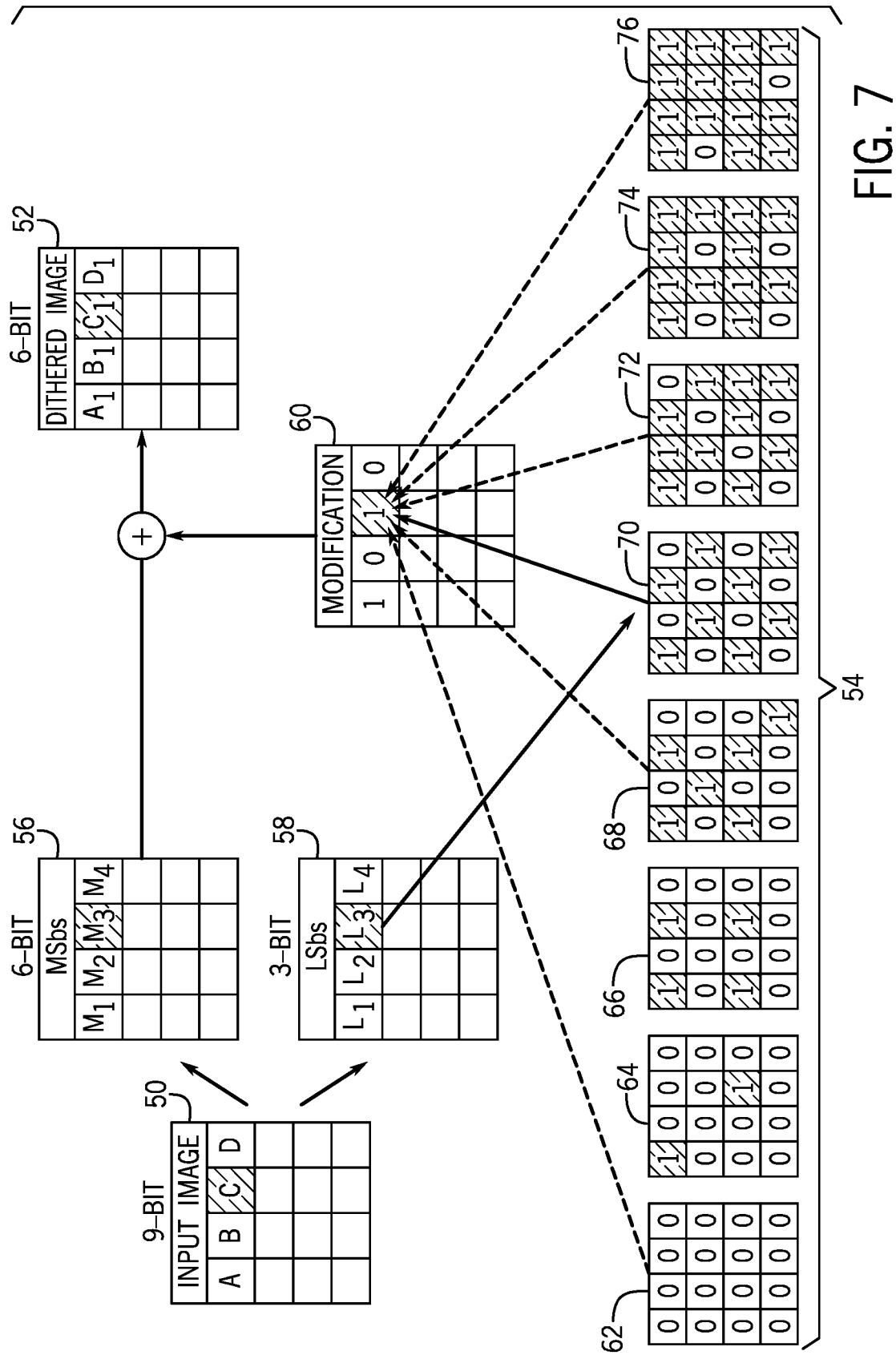
FIG. 7 is an diagrammatic representation of an example spatial dithering technique that may be used by the electronic device of FIG. 1, in accordance with an embodiment.

To help illustrate, an example of a dithering operation, which may be performed by a display pipeline 36, is shown in FIG. 7. In some embodiments, one or more active regions in an image may be identified and corresponding input image data 50 may be determined and processed. In some embodiments, dithering may be performed in an active region, for example, independent from other regions of the image. Additionally, in some embodiments, an active region may be set to group together related portions of an image while excluding unrelated portions of the image. For example, an active region may be set to exclude subtitles, constant color sections (e.g., letterboxes), and/or the like. Additionally or alternatively, an active region may include a portion of an image separated via picture-in-picture or split-screen. In some embodiments, the active region may include the entire image or a full image frame.

In the example shown in FIG. 7, input image data 50, which allocates 9-bits per color component, is dithered to produce dithered image data 52, which allocates 6-bits per color component. In some embodiments, to introduce color noise, dithering patterns 54 may be applied to the input image data 50. More specifically, applying the dithering patterns 54 may spatially distribute the colors and intensities of the input image data 50 across multiple pixels, which, at least in some instances, may facilitate preserving perceived image quality when the dithered image data 52 is used to display a corresponding image.

In some embodiments, the input image data 50 may be decomposed by color component (e.g., channel) before applying the dithering patterns 54. For example, the input image data 50 may be decomposed into red component image data, which describes red intensity levels, green component image data, which describes green intensity levels, and blue image data, which describes blue intensity levels. Additionally, in some embodiments, the input image data 50 may be subdivided into one or more pixel groups (e.g., active regions or windows) each corresponding with a different areas of the image. In the depicted embodiment, a 4×4 pixel group is utilized. In other embodiments, other sized pixel groups (e.g., larger or smaller) may be utilized.

With regard to the depicted embodiment, since dithered image data 52 that allocates 6-bits per color is the desired output, the 6 most significant bits (MSbs) of the input image data 50 may be processed separately from the least significant bits (LSbs) of the input image data 50. As such, the input image data 50 may be used to create a corresponding MSb group 56 and LSb group 58. In other words, bits of input image data 50 that indicates target luminance of a pixel may be divided into two values—namely a LSb value and a MSb value—based on bit position.

In some embodiments, input image data 50 may be provided or converted to indicate target luminance of a color component as a binary value, which may then be divided into the LSb value and the MSb value. The most significant bits, equal to the desired bit-depth (e.g., 6 bits), are selected as the MSb value and the remaining bits are selected as the LSb value. For example, when it has a 9-bit bit-depth, the input image data 50 may indicate a decimal intensity level of forty-four as a "000101100" binary number. Additionally, when the dithered image data 52 has a 6-bit bit-depth, the input image data 50 may be divided into a "000101" binary number and "100" binary number. The dithering patterns 54 may be selected based on the LSb values and used to create a modification matrix 60, which may be applied (e.g., added) to the MSb group 56 to generate the dithered image data 52.

To help illustrate, in the depicted embodiment, the input image data 50 may include values as follows A="010001101," B="110011011," C="000101100," and D="111100000." The most significant bits (e.g., six bits) of the input image data 50 may be used to derive the cell values M1="010001," M2="110011," M3="000101," and M4="111100" of a first row of the MSb group 56. The remaining three bits of the of the input image data 50 may be used to derive the cell values L1="101," L2="011," L3="100," and L4="000" of a first row of the LSb group 58.

As described above, the dithering patterns 54 (e.g., individual dithering patterns 62, 64, 66, 68, 70, 72, 74, and 76) may then be selected and used to create the modification matrix 60 based on the LSb group 58. More specifically, the magnitude or value of the 3-bit binary number stored in each cell of the LSb group 58 may be used to select one of the eight illustrated dithering patterns 54. For example, in the depicted embodiment, cell L4 may have the decimal value of "0," which corresponds to the first of eight possible values (e.g., 0 to 7). Accordingly, the first dithering pattern 62 may be selected. Similarly, since the cell L3 indicates a decimal value of "4," the fifth dithering pattern 70 may be selected. Additionally, since the cell L2 indicates a decimal value of "3," the fourth dithering pattern 68 may be selected. Furthermore, since the cell L1 indicates a decimal value of "5," the sixth dithering pattern 72 may be selected. In this way, each cell in the first row of the LSb group 58 may be mapped to a dithering pattern 54. Similarly, the other cells of the LSb group 58 may be mapped to one of the dithering patterns 54.

Once the dithering patterns 54 are selected, the LSb group 58 may be used to select one of the cells in each of the selected dithering patterns 54 for use in the modification matrix 60. To make such a selection, the position of each cell in the LSb group 58 may be used to identify the same position in the selected dithering pattern 54. For example, in the depicted embodiment, L3 may first be used to select the dithering pattern 70 and then L3's cell position may be used to select the first row, third column cell in the dithering pattern 70. The value in this first row, third column cell (i.e., "1") of the dithering pattern 70 may then be used to fill the cell at the same position (i.e., first row, third column) in the modification matrix 60. Similarly, cells L1, L2, and L4 may be used to fill in the first row of the modification matrix 60.

In some embodiments, the selection of the cell of the dithering pattern 54 to be used in the modification matrix 60 may be based on the 2 LSbs of the x and y coordinates of a corresponding pixel location. These 2 LSbs of the x and y coordinates may be used as row and column lookups in the matrix of the dithering pattern 70. As such, if a 4×4 pixel grouping is utilized and aligned with the x and y coordinates of the pixel grid, this may yield the same cell matchup as described above.

The modification matrix 60 may then be applied (e.g., added) to the MSb group 56, for example, using matrix addition. That is, each cell in the MSb group 56 may be added to the corresponding cell in the modification matrix 60. The result of the addition operation is the dithered image data 52. For example, using the values in the depicted embodiment, the decimal values for the first row of the dithered image data 52 is A1="17"+"1"="18," B1="51"+"0"="51," C1="5"+"1"="6," and D1="60"+"0"="60." The remaining rows of the dithered image data may be similarly determined. Although the dither block 46 may maintain the cell values in binary, the dithered image data 52 may indicate target luminance using 6-bits per color component. As stated above, pixel groups may be of any desired size. As such, if dithering one pixel at a time, the above mentioned matrices may be single values.

Figure 8:
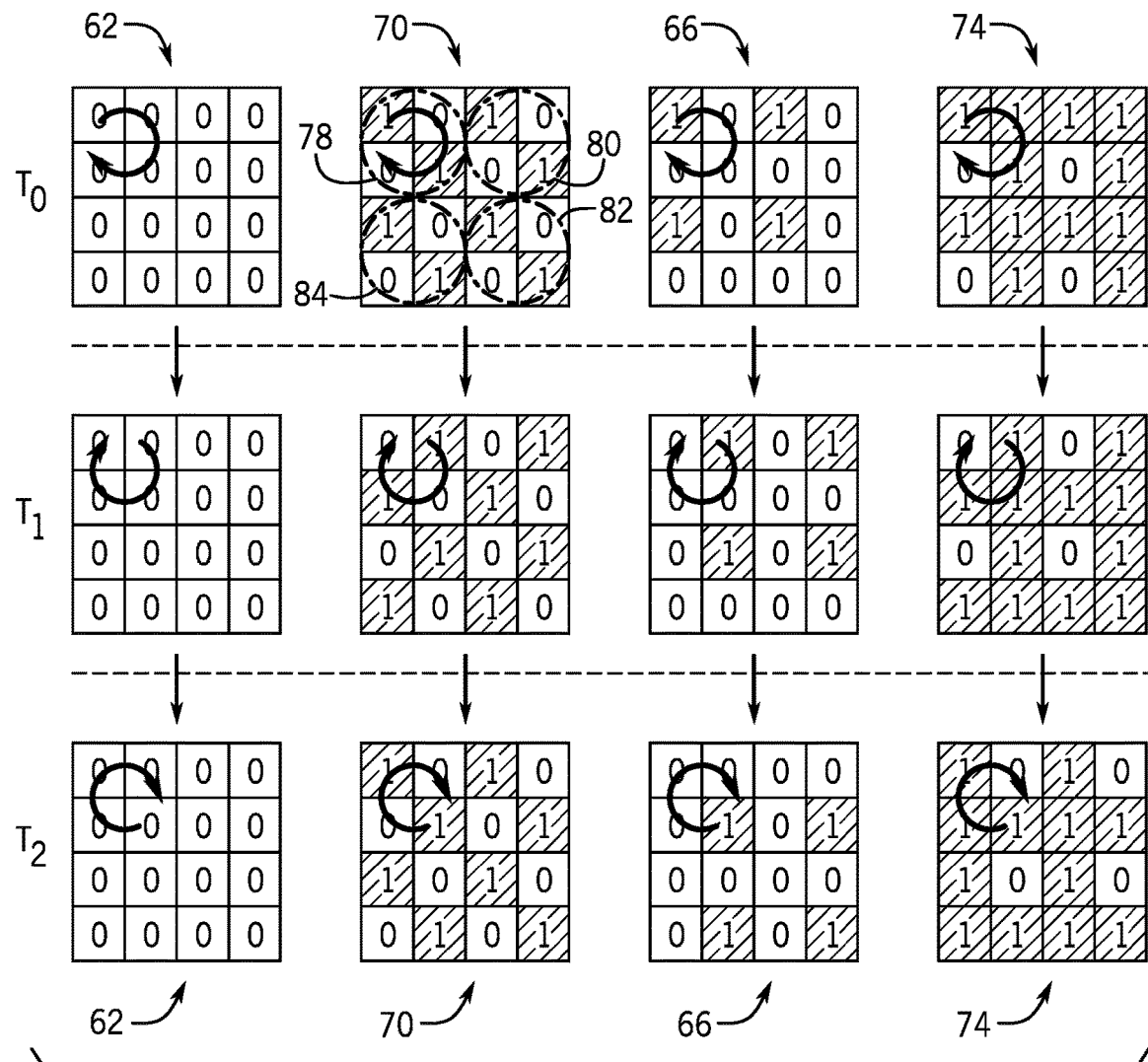
FIG. 8 is an diagrammatic representation of an example spatiotemporal dithering technique that may be used by the electronic device of FIG. 1, in accordance with an embodiment.

By way of further example, an example of a spatiotemporal dithering operation is described in FIG. 8. As described above, an image may be temporally dithered such that a viewer's eyes combine (e.g., blend) successively displayed images. For example, the color of a display pixel in a first image may be blended with the color of the display pixel in a second image, thereby enabling a viewer to perceive an intermediate color.

In some embodiments, temporal dithering techniques may be combined with spatial dithering techniques into a spatiotemporal dithering technique. For example, spatial dithering techniques may be combined with temporal dithering techniques by temporally changing the spatial dithering patterns 54 described in FIG. 7. In other words, any of the dithering patterns 54 may be temporally changed and used in addition to the LSb-MSb techniques described above to further improve the viewed accuracy of a displayed image.

By way of example, each row in the depicted embodiment represents a temporal frame at times T0, T1, and T2. More specifically, a first row, T0, shows an example of an initial condition (e.g., position of the zero and ones at a reference point in time) of the dithering patterns 62, 70, 66, and 74 at T0. Additionally, a second row shows a condition of the dithering patterns 62, 70, 66, and 74 at T1, for example, in the next frame. As depicted, the dithering patterns 54 are temporally shifted at T1 from their positions at T0, for example, via a clockwise rotation of the cells. More specifically, in the depicted embodiment, each dithering pattern

54 is divided into groups of four cells. In other words, each dithering pattern 54 may be divided into a top left quadrant 78, a top right quadrant 80, a bottom right quadrant 82, and a bottom left quadrant 84. As such, each quadrant may have its cells rotated in a clockwise direction as depicted. For example, the top row (e.g., top two cells) of the top left quadrant 78 of the dithering pattern 70 has shifted from storing the values "1" and "0" at time T0 to storing the values "0" and "1" at time T1. Additionally, the bottom row (e.g., bottom two cells) of top left quadrant 78 of the dithering pattern 70 has shifted from storing the values "0" and "1" at time T0 to storing the values "1" and "0" at time T1. As described above, the shifted dithering patterns at T1 may then be used to create the modification matrix 60 and spatially dither the image.

Additionally, a third row shows a condition of the dithering patterns 62, 70, 66, and 74 at T2. The dithering patterns 54 may similarly be generated by temporally shifting the dithering patterns at T2, for example, via a clockwise rotation of the cells. This clockwise rotation may occur after each frame and/or after a programmed time period. As such, four phases of temporal dithering may accomplished. In some embodiments, it may be desired to employ a different phase for different color components such that the dithering pattern for each color does not overlap with the dithering pattern of another color. This may reduce the chance of flicker or other dithering artifacts.

Additionally, although stated above as having an order, the temporal phases may proceed in a different sequence. Additionally or alternatively, the temporal phases may proceed in a pseudorandom sequence and/or use different sequences for different color components. Accordingly, temporally dithering the spatial dithering patterns 54 may enable the electronic display 12 to display image data such that the viewed image is perceived as having a higher visual quality because the human eye may blend multiple successively displayed images, thereby increasing the perceivable color pallet of the electronic display 12.

Figure 9:
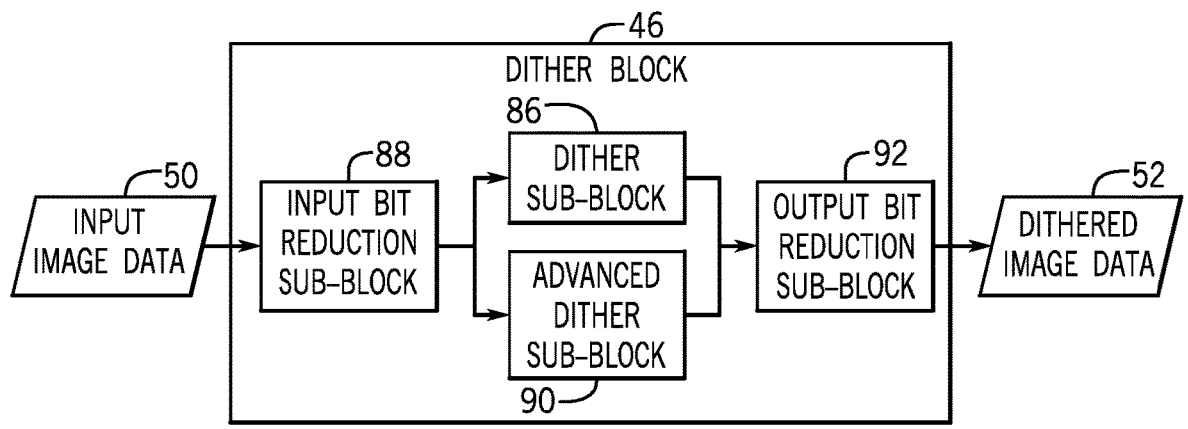
FIG. 9 is a block diagram of a dither block implemented in the display pipeline of FIG. 6, in accordance with an embodiment.

In some embodiments, a dither block 46 may have a repertoire of more than one technique for dithering. As such, the dither sub-block 86 described above may be but one option for dithering in a dither block 46, as shown in FIG. 9. When received by the dither block 46, input image data 50 may be processed by an input bit reduction sub-block 88 (e.g., circuitry). The input bit reduction sub-block 88 may round and/or truncate the input image data 50 before dithering to facilitate reducing bit-depth. Depending on the input and/or target output bit-depth, the input bit reduction sub-block 88 may reduce the effective bit-depth by 0, 1, 2, or more bits.

The image data may then enter a dither sub-block 86 (e.g., circuitry), an advanced dither sub-block 90 (e.g., circuitry), or both. In some embodiments, the dither sub-block 86 may implement any combination of the dithering operations described with reference to FIGS. 7 and 8. In some embodiments, the advanced dither sub-block 90 may also perform spatial dithering operations, temporal dithering operations, or spatiotemporal dithering operations. However, in some embodiments, the dithering operations performed by the advanced dither sub-block 90 may utilize a different process for determining modification values compared to the dither sub-block 86.

Dithered image data 52 may also undergo an output bit reduction sub-block 92 (e.g., circuitry) before being output. The output bit reduction sub-block 92 may operate similar to the input bit reduction sub-block 88 in that it may reduce the effective bit-depth (e.g., by 0, 1, 2, or more bits) by rounding and/or truncation. In some embodiments, it may be desired that no bits are rounded or truncated and, as such, the input bit reduction sub-block 88 and/or the output bit reduction sub-block 92 may be bypassed or not used.

Figure 10:
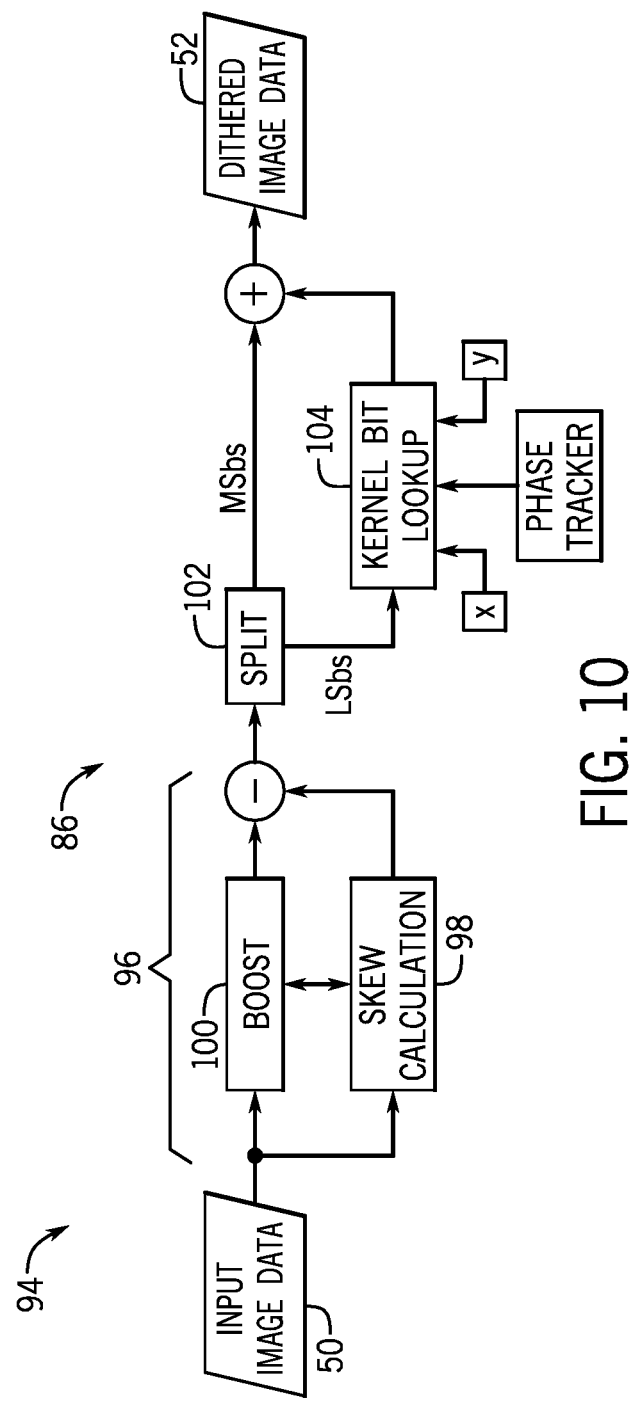
FIG. 10 is a schematic diagram of a dithering stage of the dither block of FIG. 9, in accordance with an embodiment.

To help further illustrate the dithering techniques, FIG. 10 illustrates a schematic diagram 94 of the dither sub-block 86. The input image data 50, which may have undergone rounding or truncation via the input bit reduction sub-block 88, may enter a pre-conditioning stage 96. The pre-conditioning stage 96 may include a skew calculation sub-stage 98 and, in some embodiments, a bit boost sub-stage 100. In some embodiments, the pre-conditioning stage 96 may also include a pop sub-stage, in which the bit-depth may be further truncated.

The skew calculation sub-stage 98 may enable the input color component intensity range to be reduced to fit that of the output with improved perceived image quality. One inherent property of dithering is that some levels of the input image data 50 may not be reproduced. For example, when 10-bit per color component image data, with intensity levels from 0 to 1023, are to be displayed on an 8-bit electronic display 12, with intensity levels 0 to 255, source image intensity levels 0, 4, 8, . . . , 1020 may be represented by the electronic display 12 as intensity levels 0, 1, 2, . . . , 255 respectively. Most input intensity levels may be represented by dithering between the intensity levels available to the electronic display 12. However, source image intensity levels 1021, 1022, 1023, which would require intensity levels 255 and 256 to be dithered, may not represented as the electronic display intensity level 256 does not exist. As such, the 3 uppermost source image intensity levels are clamped at 1020 and thus lost.

The skew calculation sub-stage 98 adds flexibility with regard to where to intensity level resolution is lost. For example, the skew calculation sub-stage 98 may map the input image data 50 such that lost intensity levels are spread out throughout color component intensity range. In this manner, instead of always losing intensity resolution at the top of the range or a specific portion thereof, lost intensity levels may be spread out, for example, based on image content, which, at least in some instances may facilitate reducing the impact bit-depth reducing has on resulting perceived image quality.

Losing some color component intensity levels completely, regardless of where, can be undesirable. One way to avoid lost levels is to have two compressed levels in place of each lost level. This may be done by utilizing a bit boost sub-stage 100. If a bit boost sub-stage 100 is incorporated into the pre-conditioning stage 96, an extra bit is added to boost the bit-depth of the input image data 50 such that the input image data 50 may be dithered without clamping. The mapping of the skew calculation sub-stage 98 may, for the example, include 6 compressed color component intensity levels instead of 3 lost intensity levels. However, a bit boost sub-stage 100 may, therefore, increase the number of bits to be dithered.

After the skew calculation sub-stage 98, the MSbs and the LSbs of the input image data 50 may be taken apart at a split stage 102, as described above. The LSbs may be analyzed by a kernel bit lookup stage 104. Additionally, as described above, the x and y coordinates of the pixel in a pixel group or the pixel grid, along with a phase tracker may enable the kernel bit lookup stage 104 to output a modification value to be added to the MSbs to produce dithered image data 52.

Figure 11:
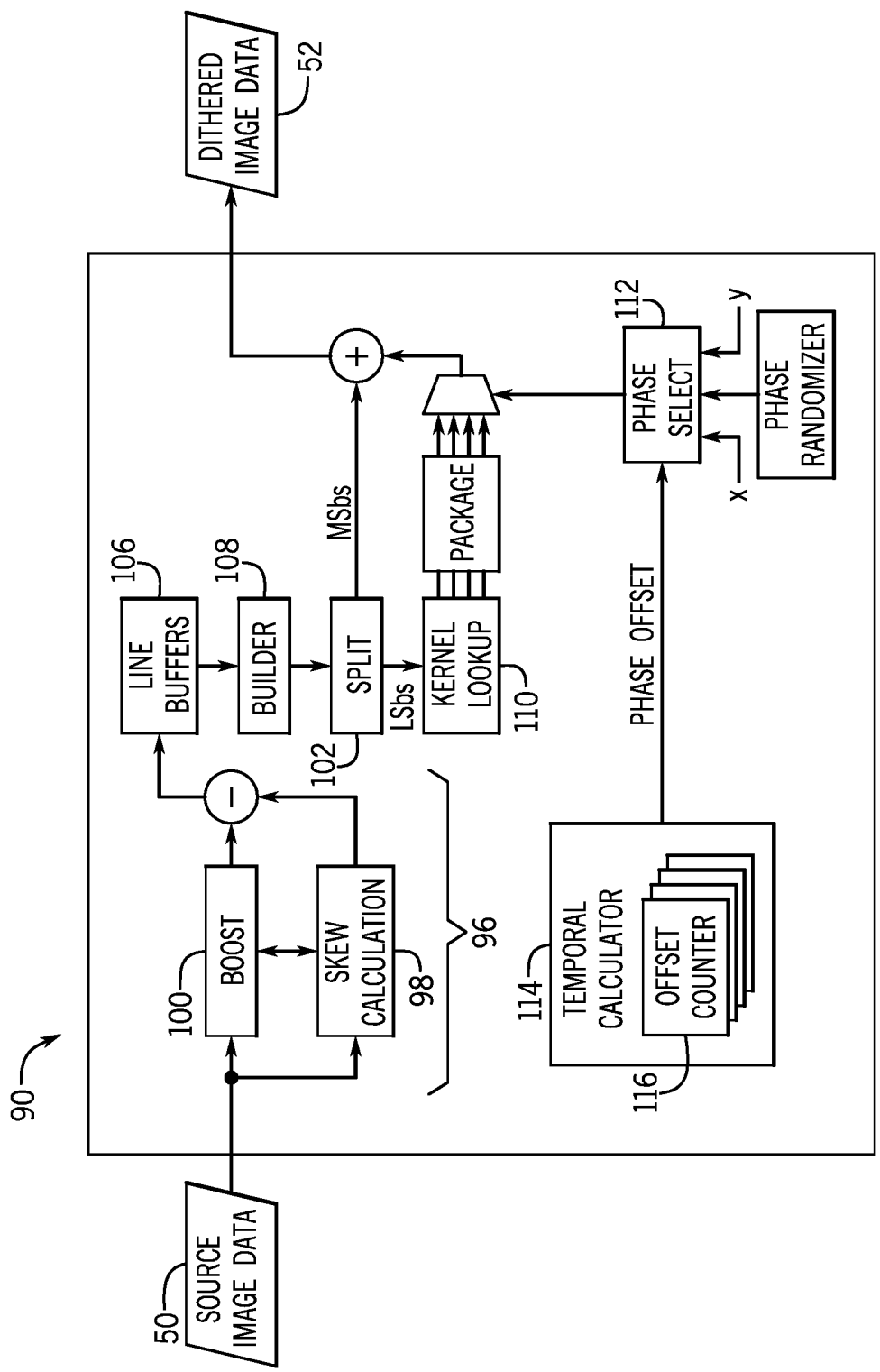
FIG. 11 is a schematic diagram of an advanced dithering stage of the dither block of FIG. 9, in accordance with an embodiment.

As depicted in FIG. 11, the advanced dither sub-block 90 may also include a pre-conditioning stage 96. To prepare the input image data 50 for dithering, the advanced dither sub-block 90 may buffer one or more lines of the input image data 50 in one or more line buffers 106. A builder stage 108 may create a pixel group from one or more lines of pixels. For example, the builder stage 108 may create a 2×2 pixel group, which includes the image data of two sub-pixels in each of two lines. Each sub-pixel of the pixel group may represent the intensity of a color component of a pixel. Additionally, the split stage 102 may divide input image data 50 corresponding with the pixel group into MSbs and LSbs (e.g., 2 bits).

The LSbs of a color component for each of the pixels in a pixel group may be strung together to form a higher bit index value. For example, when the 2 LSbs of a color component for each pixel of a 2×2 pixel group are strung together, an 8-bit index value may be created. In some embodiments, the index value may be used in a kernel lookup stage 110 to determine a modification package of modification values for the color component intensities of each of the pixels in the pixel group for a number of different phases (e.g., 4).

A phase select stage 112 may utilize pixel location, along with a phase randomizer and, in some embodiments, a temporal phase offset to select the phase for a pixel group created by the builder stage 108. In some embodiments, each color component of a pixel group may be set to the same phase or to a different phase. A temporal phase offset may be determined from a temporal calculator stage 114. For example, the temporal phase offsets may be cycled through per frame such that the temporal phase offset changes in each successive frame. In one embodiment, the temporal phase offset may be determined based at least in part on a randomized list of temporal phase offsets indexed by the value of a frame counter. Additionally, the temporal calculator stage 114 may have one or more offset counters 116 (e.g., four) to keep track of the on-screen time of each temporal phase offset. For example, if arbitrary presentation time (APT) is desired, each frame, and, thus, phase offset may be on screen for unequal amounts of time. The offset counters 116 may facilitate choosing a temporal phase offset based on the on-screen time of each relative to an on-screen time threshold.

Figure 12:
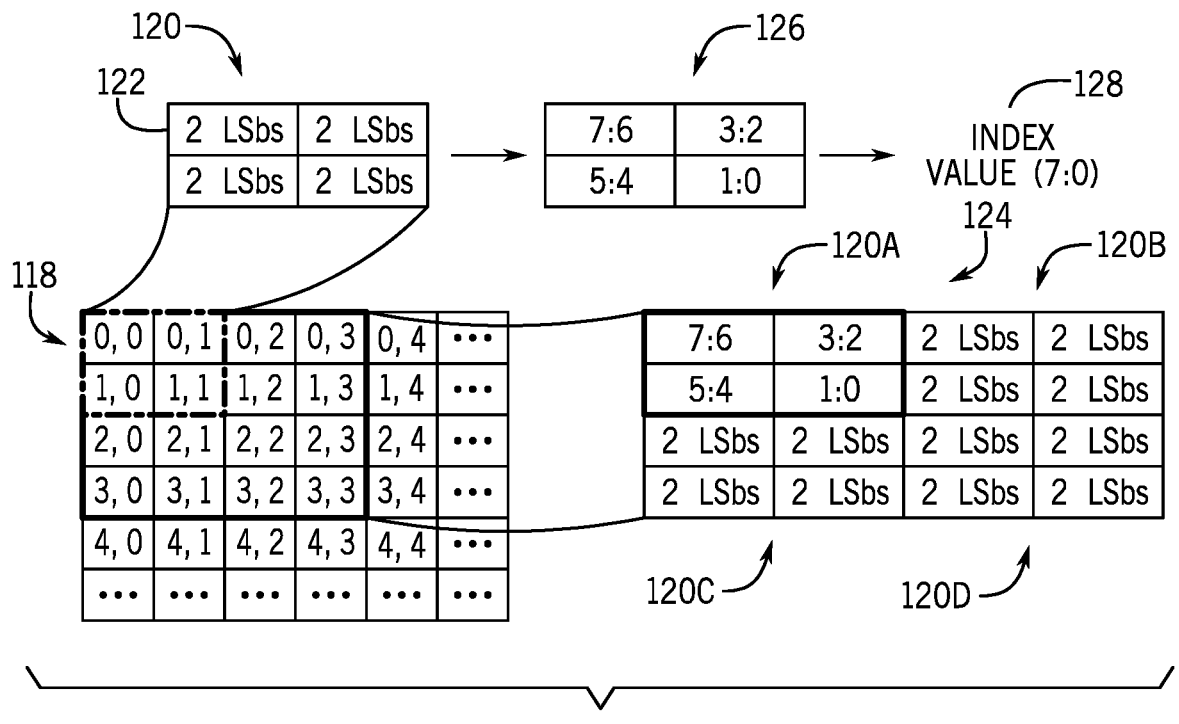
FIG. 12 is a diagrammatic representation of pixel groupings and pixel data, in accordance with an embodiment.

To help illustrate the determination of the modification values for each color component, FIG. 12 shows a pixel grid 118 of pixel locations with an example 2×2 pixel group 120 built from the first two lines of pixels. The example pixel group 120 includes four sub-pixels 122 each indicating the two LSbs of a color component of a corresponding pixel. For example, when each pixel has three color components, three pixel groups 120 may be built, each corresponding with one of the color components.

Multiple pixel groups 120 (e.g., four) may be further assembled into a pixel cluster 124, for example, by the builder stage 108. In the illustrated example, four 2×2 pixel groups 120A, 120B, 120C, and 120D may be assembled into a 4×4 pixel cluster 124. As mentioned above, the LSb values of each sub-pixel 122 in a pixel group 120 may be used together, as illustrated by the index grouping 126, to form an index value 128. In the illustrated example, the 2 LSb values from each sub-pixel 122 may be strung together to form an 8-bit (7:0) index value 128.

Figure 13:
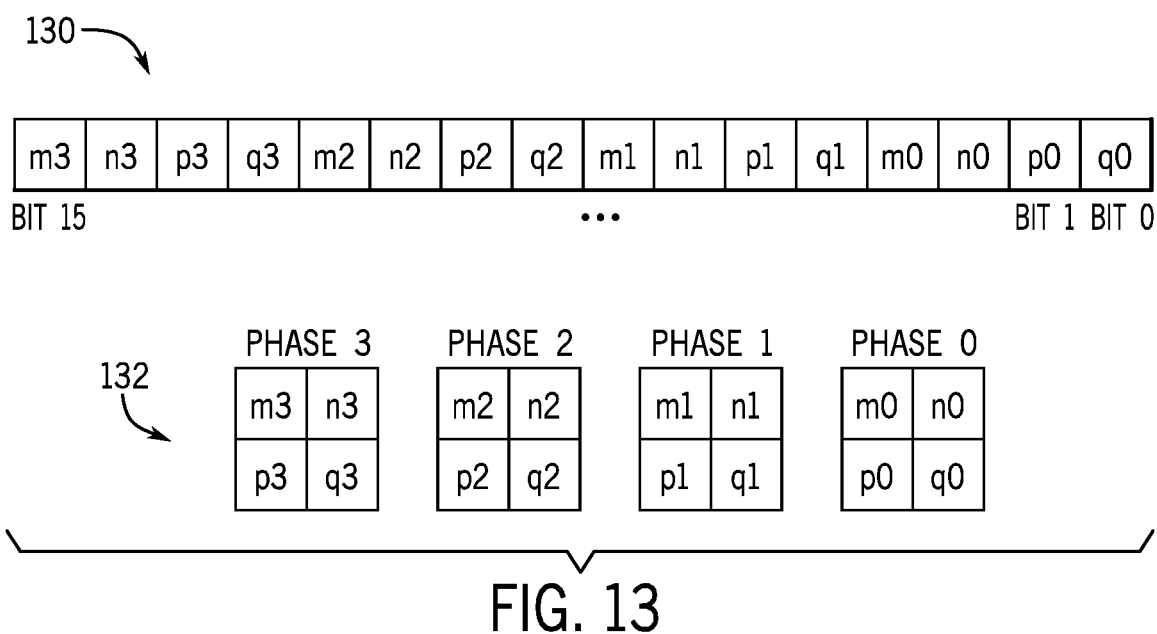
FIG. 13 is a diagrammatic representation of modification values and an example ordering thereof for in the dither block of FIG. 9, in accordance with an embodiment.

The index value 128 may be used to determine, for example, by table lookup or mapping, a modification package 130, exampled in FIG. 13. In the depicted embodiment, the modification package 130 is a 16-bit list of modification values, illustrated as q0, p0, n0, m0 through q3, p3, n3, m3, for the four sub-pixels 122 of the associated pixel group 120 for four phases. Each index value 128 may yield a particular set of values for q0, p0, n0, m0 through q3, p3, n3, m3. When a phase is selected, the corresponding values of the modification package 130 may be used as the modification values for each sub-pixel 122 of the associated pixel group 120. The values of the modification package 130 may be mapped to the corresponding sub-pixels 122, for example, as illustrated by phase packaging groups 132.

In some embodiments, the phase may be cycled through, as exampled with the dither sub-block 86. However, the advanced dither sub-block 90 may employ a randomization effect on the phase to minimize pattern artifacts. For example, the advanced dither sub-block 90 may implement a linear-feedback shift register (LFSR) to create a pseudo-random phase selection. Additionally, the phase may be further spatially diversified by setting each pixel group 120 of a pixel cluster 124 to a different phase. For example, returning to FIG. 12, there may be twenty-four different combinations of phase selection such that the pixel groups 120A, 120B, 120C, and 120D each have a different phase. A randomization effect may be used to determine which of the twenty-four phase selection combinations is used. In some embodiments, a new phase selection is determined for each frame. As such, a randomization effect as well as the pixel location may factor into the phase selection.

Figure 14:
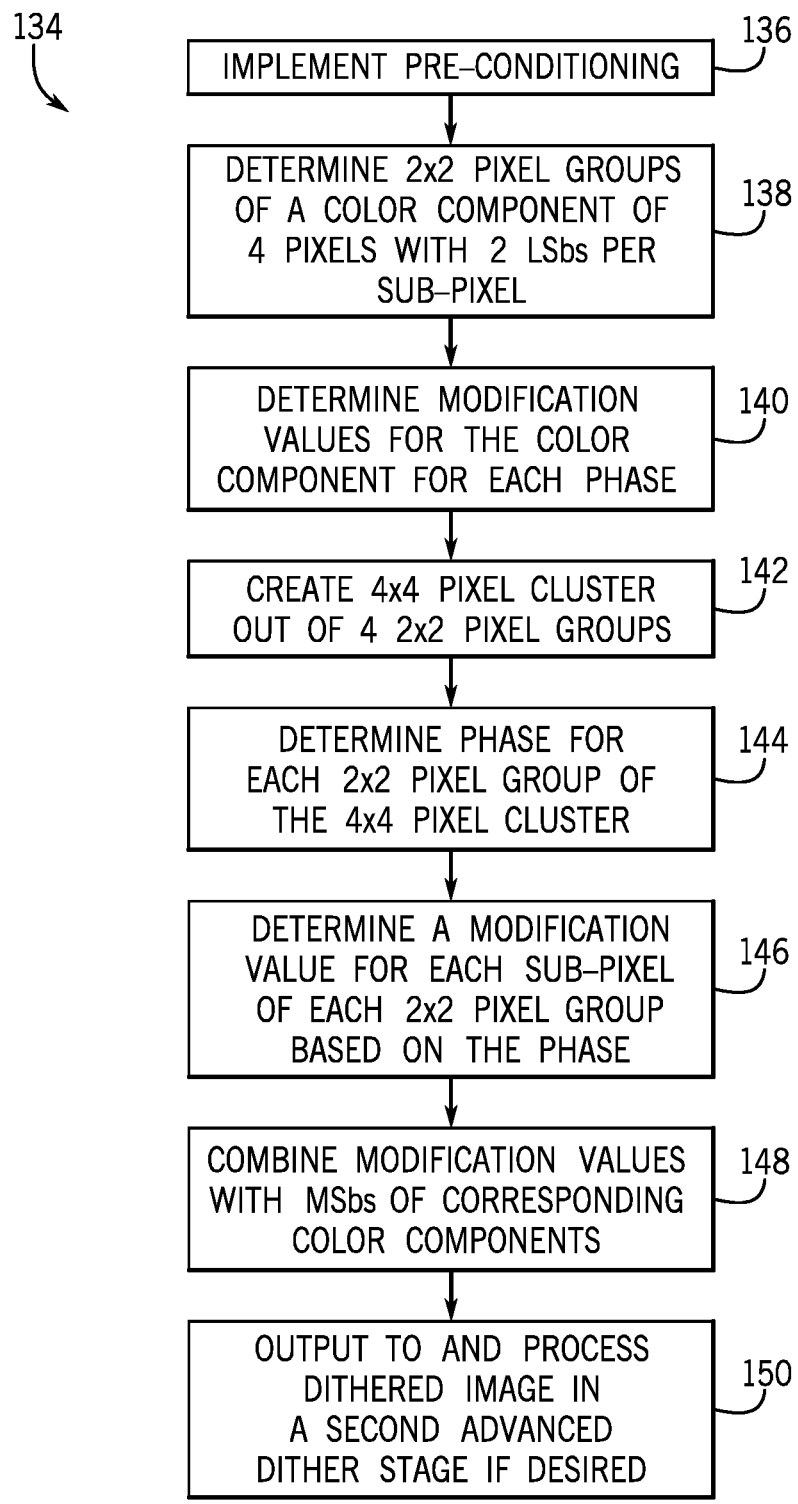
FIG. 14 is a flowchart of a process for operating the advanced dithering stage of FIG. 10, in accordance with an embodiment.

To help illustrate the dithering process of the advanced dither sub-block 90, the flowchart 134 of FIG. 14 shows an example process using 2×2 pixel groups 120. The advanced dither sub-block 90 may implement a pre-conditioning stage 96 on the input image data 50 (process block 136). The advanced dither sub-block 90 may also determine 2×2 pixel groups 120 of a color component of four pixels with two LSbs for each sub-pixel 122 (process block 138). The LSbs of each sub-pixel 122 of a pixel group 120 may be strung together to create an index value 128 to determine the modification values for the color component intensity for each phase (process block 140). A 4×4 pixel cluster 124 may be created by assembling four of the 2×2 pixel groups 120 (process block 142). Additionally, the phase may be determined for each 2×2 pixel group 120 of the 4×4 pixel cluster 124 (process block 144). In some embodiments, a different phase may be applied to each pixel group 120 of a pixel cluster 124. When the phase is selected for a 2×2 pixel group 120, a modification value for each sub-pixel 122 in the pixel group 120 may be determined (process block 146). The modification value for each sub-pixel 122 may then be combined with the MSbs of the corresponding color components (process block 148). This recombination may be done, for example, by binary addition.

In some embodiments, another advanced dither sub-block 90 may follow the advanced dither sub-block 90. For example, the advanced dither sub-block 90 dithers two bits and the subsequent advanced dither sub-block 90 may dither two more bits (e.g., minus any bit boosting). Therefore, the dithered image data 52 may be output to and processed in a second advanced dither sub-block 90 if further bit-depth reduction is desired (process block 150).

As mentioned above, a temporal calculator stage 114 of the advanced dither sub-block 90 may be utilized to determine a temporal phase offset, which is used in conjunction with the phase select stage 112. In some embodiments, there may be four different temporal phase offsets, which may be chosen based on a frame counter that updates on each new frame. In other embodiment, a temporal phase offset may be chosen from more than four (e.g., five) temporal phase offsets or fewer than four (e.g., three) temporal phase offsets.

Additionally, the frame counter may not update if the dither block 46 is disabled, as temporal dithering may no longer be desired.

When enabled, the advanced dither sub-block 90 may maintain accurate temporal dithering during an APT scenario by using the one or more offset counters 116. This accuracy is maintained by keeping track of the on-screen time for each of the temporal phase offsets. In some embodiments, there may be an offset counter 116 for each temporal phase offset (e.g., four). During an APT scenario, the on-screen time of each frame may vary. As such, the on-screen time of a particular temporal phase offset, for a corresponding frame, may be longer or shorter than other temporal phase offsets. Therefore, offset counters 116 may be used to keep track of the on-screen time of each temporal phase offset. If, during the course of displaying images, on-screen time of a temporal phase offset exceeds an on-screen time threshold, a rectification may occur. In such a case, the temporal phase offset with the lowest on-screen time, as tracked by the offset counters 116, may be used until a threshold balance is achieved. As such, the offset counters 116 may keep track of the on-screen time of each temporal phase offset such that rectification may occur to keep the on-screen time of each temporal phase offset approximately the same, at least in the aggregate. Additionally or alternatively, weights may be applied to the selection of a temporal phase offset such that temporal phase offsets with less on-screen time, as tracked by the offset counters 116, may be more likely to be chosen than temporal phase offsets with more on-screen time.

FIG. 15 is a flowchart 152 describing operation of a temporal calculator stage 114, which may be implemented in an advanced dithering sub-block 90. When temporal dithering is enabled (process block 154), the temporal calculator stage 114 may determine a temporal phase offset based on a frame counter (process block 156). Additionally, the temporal calculator stage 114 may determine whether on-screen time of a temporal phase offset exceeds an on-screen time threshold (process block 158). Accordingly, an appropriate temporal phase offset may be selected (process block 160) and implemented (process block 162), for example, in the phase select stage 112. While a temporal phase offset is in use, the corresponding offset counter 116 may be updated for on-screen time (process block 164).

In some embodiments, the electronic display 12 may incorporate polarity switching between frames. In other words, in such embodiments, voltage polarity used to write a display pixel may alternate between negative and positive during successive frames. In the case of an APT scenario, the temporal calculator stage 114 may utilize a set of offset counters 116 for each polarity. Each temporal phase offset would have two offset counters 116, one corresponding to a positive polarity and another corresponding to a negative polarity. As such, in an embodiment with four temporal phase offsets, eight offset counters 116 may be used. Using the multiple sets of offset counters 116, the temporal calculator stage 114 may track the on-screen time of each temporal phase offset for each polarity independently. The handling of the temporal phase offsets for each polarity independently may facilitate reducing the magnitude of charge accumulation and, thus, the likelihood of the charge accumulation causing perceivable visual artifacts. In some embodiments, the offset counter values may be stored and restored by other circuitry when the electronic device 10 and/or electronic display 12 is turned off and on. The polarity balancing and/or reduction in charge accumulation may be desired properties of the advanced dither sub-block 90 and, in some embodiments, may not be integrated with the dither sub-block 86.

In further illustration, FIG. 16 is a flowchart 166 describing the use of a temporal calculator stage 114 with polarity handling. The temporal calculator stage 114 may first be set to enable polarity handling if desirable, for example, when an electronic display 12 with polarity switching is being used (process block 168). If an electronic display 12 is used where polarity switching does not occur or is known to not cause charge accumulation issues, the independent polarity handling may be turned off. The temporal calculator stage 114 may also track the on-screen time of each temporal phase offset for each polarity independently, yielding a set of on-screen time values for each temporal phase offset of each polarity (process block 170). It may also be determined if one of the temporal phase offsets, for the polarity of the current frame, is beyond an on-screen time threshold (process block 172). The appropriate temporal phase offset may then be selected and implemented based, at least in part, on whether or not the threshold was reached (process block 174). When the frame is shown on the electronic display 12, the offset counter 116 corresponding to the implemented temporal phase offset for the polarity of the current frame may be updated based on the on-screen time of the frame (process block 176). The polarity of the subsequent frame may differ from the current frame, and, as such, an offset counter 116 in the set corresponding to the subsequent polarity may be next updated.

The advanced dither sub-block 90 may have desired properties such as APT compatibility. In fact, the advanced dither sub-block 90 may possess zero or near zero temporal average error for each color component with reduced (e.g., minimal) frame to frame intensity variation, for example, compared to the dither sub-block 86. The advanced dither sub-block 90 also employs randomization of the phases to reduce (e.g., minimize) likelihood that the dithering patterns are perceivable, especially on solid colors. The advanced dither sub-block 90 may also have less worst-case spatial average error on the component intensity levels, for example, compared to the dither sub-block 86. This gain in spatial averaging may be due to, for example, the use of image data from multiple pixels to determine the color component intensity of a single pixel. As such, the advanced dither sub-block 90 may enable cascading of dithering operations, for example, with a first advanced dither sub-block 90 followed by a second advanced dither sub-block 90 without causing large errors.

As mentioned above, a first advanced dither sub-block 90 may dither 2-bits or 4-bits when a second advanced dither sub-block 90 is implemented. Trivially, an advanced dither sub-block 90 may dither zero bits if so desired. As an illustrative example, the dither sub-block 86 may dither 0, 1, 2, or 3 bits. Modifications may be made to either the dither sub-block 86 or the advanced dither sub-block 90 to accommodate other bit-depth reductions. For example, sixteen dithering patterns 54 may be referenced instead of eight to accommodate dithering four bits in the dither sub-block 86. Likewise, the number of LSbs in each sub-pixel 122 processed by the advanced dither sub-block 90 may be altered as desired with appropriate changes to the index values 128 and modification packages 130. Additionally or alternatively, the sizes of the pixel groups 120, pixel clusters 124, LSb groups 58, and/or MSb groups 56 may also be modified.

Although the above referenced flowcharts 134 and 152 are shown in a given order, in certain embodiments, process blocks may be reordered, altered, deleted, and/or occur simultaneously. Additionally, the referenced flowcharts 134 and 152 are given as illustrative tools and further decision and process blocks may also be added depending on implementation.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device comprising:
an electronic display configured to display an image based at least in part on display image data that indicates target luminance in the image using a first bit-depth; and
a display pipeline coupled to the electronic display, wherein the display pipeline is configured to generate the display image data based at least in part on dithered image data and comprises dither processing circuitry programmed to:
determine a first pixel cluster in input image data that indicates target luminance in the image using a second bit-depth greater than the first bit-depth, wherein the first pixel cluster comprises a first plurality of pixel groups;
determine a first phase combination to be used to dither the first pixel cluster based at least in part on a previous phase combination used to dither a previous pixel cluster, wherein the first phase combination associates a different dither phase to each of the first plurality of pixel groups;
determine a first most significant bit portion and a first least significant bit portion of the input image data corresponding a first pixel group in the first pixel cluster;
determine a first dither pattern to be applied at the first pixel group based at least in part on the first least significant bit portion corresponding with the first pixel group and a first dither phase associated with the first pixel group by the first phase combination; and
apply the first dither pattern to the first most significant bit portion corresponding with the first pixel group to generate the dithered image data corresponding with the first pixel group with the first bit-depth.

2. The electronic device of claim 1, wherein the dither processing circuitry is programmed to:
determine a second most significant bit portion and a second least significant bit portion of the input image data corresponding a second pixel group in the first pixel cluster;
determine a second dither pattern to be applied at the second pixel group based at least in part on the second least significant bit portion corresponding with the second pixel group and a second dither phase associated with the second pixel group by the first phase combination; and
apply the second dither pattern to the second most significant bit portion corresponding with the second pixel group to generate the dithered image data corresponding with the second pixel group with the first bit-depth.

3. The electronic device of claim 2, wherein the dither processing circuitry is programmed to:
determine a third most significant bit portion and a third least significant bit portion of the input image data corresponding a third pixel group in the first pixel cluster;
determine a third dither pattern to be applied at the third pixel group based at least in part on the third least significant bit portion corresponding with the third pixel group and a third dither phase associated with the third pixel group by the first phase combination;
apply the third dither pattern to the third most significant bit portion corresponding with the third pixel group to generate the dithered image data corresponding with the third pixel group with the first bit-depth;
determine a fourth most significant bit portion and a fourth least significant bit portion of the input image data corresponding a fourth pixel group in the first pixel cluster;
determine a fourth dither pattern to be applied at the fourth pixel group based at least in part on the fourth least significant bit portion corresponding with the fourth pixel group and a fourth dither phase associated with the fourth pixel group by the first phase combination; and
apply the fourth dither pattern to the fourth most significant bit portion corresponding with the fourth pixel group to generate the dithered image data corresponding with the fourth pixel group with the first bit-depth.

4. The electronic device of claim 1, wherein the dither processing circuitry is programmed to:
determine a second pixel cluster in input image data adjacent the first pixel cluster, wherein the second pixel cluster comprises a second plurality of pixel groups;
determine a second phase combination to be used to dither the second pixel cluster based at least in part on the first phase combination, wherein the second phase combination associates a different dither phase to each of the second plurality of pixel groups;
determine a second most significant bit portion and a second least significant bit portion of the input image data corresponding a second pixel group in the second pixel cluster;
determine a second dither pattern to be applied at the second pixel group based at least in part on the second least significant bit portion corresponding with the second pixel group and a second dither phase associated with the second pixel group by the second phase combination; and
apply the second dither pattern to the second most significant bit portion corresponding with the second pixel group to generate the dithered image data corresponding with the second pixel group with the first bit-depth.

5. The electronic device of claim 1, wherein, to determine the first phase combination, the dither processing circuitry is programmed to:

determine a number of possible phase combinations, wherein each of the possible phase combinations is identified via a phase combination indicator; and determine a first phase combination indicator that identifies the first phase combination based at least in part on the number of possible phase combinations and a previous phase combination indicator that identifies the previous phase combination used to dither the previous pixel cluster.

6. The electronic device of claim 5, wherein:
the dither processing circuitry comprises a linear-feedback shift register; and
to determine the first phase combination indicator, the dither processing circuitry is programmed to:
update the linear-feedback shift register when a value of the linear-feedback shift register, modulo the number of possible phase combinations, is equal to the previous phase combination indicator; and
determine the first phase combination indicator based at least in part on an updated value of the linear-feedback shift register modulo the number of possible phase combinations.

7. The electronic device of claim 5, wherein, to determine the first phase combination indicator, the dither processing circuitry is programmed to adjust the first phase combination indicator from a first value to a second value when the first value is equal to the previous phase combination indicator that identifies the previous phase combination.

8. The electronic device of claim 1, wherein, to determine the first dither pattern, the dither processing circuitry is programmed to:
determine a temporal phase offset based at least in part on display duration of a previous image;
apply the temporal phase offset to the first dither phase associated with the first pixel group by the first phase combination to determine a final dither phase; and
select the first dither pattern from a plurality of dither patterns each corresponding with a different dither phase based on the final dither phase.

9. The electronic device of claim 8, wherein, to determine the temporal phase offset, the dither processing circuitry is programmed to:
determine a counter value associated with each of a plurality of possible temporal phase offsets based at least in part on the display duration of the previous image and a previous temporal phase offset applied in the previous image;
increment the counter value associated with the previous temporal phase offset; and
adjusting the temporal phase offset to a different one of the plurality of possible temporal phase offsets when the counter value associated with the temporal phase offset is greater than a counter threshold.

10. The electronic device of claim 1, wherein, to determine the first dither pattern, the dither processing circuitry is programmed to:
determine a plurality of dither patterns each corresponding with a different one of a plurality of phases based at least in part on the first least significant bit portion corresponding with the first pixel group; and
select the first dither pattern from the plurality of dither patterns based at least in part on the first dither phase associated with the first pixel group by the first phase combination.

11. The electronic device of claim 1, wherein the dithered image data is dithered two or more times via a plurality of cascaded stages of the dither processing circuitry.

12. An electronic device configured to process image data to be displayed on an electronic display, the electronic device comprising:
first dither block circuitry configured to spatially and temporally dither the image data, wherein the first dither block circuitry is configured to dither the image data of a single pixel based, at least in part, on the image data of the single pixel and not image data of one or more other pixels; and
second dither block circuitry configured to spatially and temporally dither the image data, wherein the second dither block circuitry is configured to dither the image data of the single pixel based, at least in part, on the image data of the single pixel and the image data of the one or more other pixels, wherein the electronic device is configured to process the image data through the first dither block circuitry, the second dither block circuitry, or both.

13. The electronic device of claim 12, wherein the second dither block circuitry is configured to determine a single index value to determine a modification value of a color component intensity of the single pixel for each of a plurality of phases, wherein the single index value is determined based on one or more least significant bits of the image data of the single pixel and the image data of the one or more other pixels.

14. The electronic device of claim 12, wherein the second dither block circuitry comprises a skew calculation stage.

15. The electronic device of claim 14, wherein the skew calculation stage incorporates a bit boost.

16. The electronic device of claim 12, wherein the second dither block circuitry comprises a plurality of offset counters configured to track an on-screen time of one or more temporal phase offsets for each of a positive polarity and a negative polarity wherein the second dither block circuitry is configured to determine a temporal phase offset for a future frame based, at least in part, on the plurality of offset counters.

17. The electronic device of claim 12, wherein the first dither block circuitry and the second dither block circuitry are implemented in a display pipeline, wherein the display pipeline comprises:
an input bit reduction stage configured to reduce a bit-depth of the image data via rounding, truncation, or a combination thereof, wherein the input bit reduction stage occurs prior to the first dither block circuitry and the second dither block circuitry; and
an output bit reduction stage configured to reduce the bit-depth of the image data via rounding, truncation, or a combination thereof, wherein the output bit reduction stage occurs after the first dither block circuitry and the second dither block circuitry.

18. A method for dithering image data for display on an electronic display, the method comprising:
determining, via dither block circuitry of an electronic device, a plurality of pixel groups each comprising the image data of a plurality of pixels;
determining, via the dither block circuitry, a temporal phase offset of a plurality of temporal phase offsets, wherein determining the temporal phase offset comprises determining, via the dither block circuitry, if one of the plurality of temporal phase offsets has had a disproportionately higher amount of an on-screen time compared to the plurality of temporal phase offsets, wherein the on-screen time of each of the plurality of temporal phase offsets is tracked via a plurality of offset counters;

determining, via the dither block circuitry, a phase for each of the plurality of pixel groups based at least in part on the temporal phase offset;

determining, via the dither block circuitry, a modification value for each color component intensity of each of the plurality of pixels of the plurality of pixel groups;

combining, via the dither block circuitry, the modification value with the image data to yield dithered image data, wherein a bit-depth of the dithered image data is smaller than a bit of the image data; and outputting, from the dither block circuitry, the dithered image data.

19. The method of claim 18, wherein the plurality of offset counters comprises a first set of offset counters corresponding to a first polarity and a second set of offset counters corresponding to a second polarity, wherein the temporal phase offset is determined based, at least in part, on either the first set of offset counters or the second set of offset counters depending on a current polarity.

20. The method of claim 18, wherein the dither block circuitry comprises one or more line buffers configured to assist in determining the plurality of pixel groups.

* * * * *